United States Patent [19]

Jylhä

[11] Patent Number: 5,604,728
[45] Date of Patent: Feb. 18, 1997

[54] METHOD FOR TESTING A TRANSCEIVER, AND BASE STATION OF A TIME-DIVISIONAL RADIOCOMMUNICATION SYSTEM

[75] Inventor: Raimo Jylhä, Oulu, Finland

[73] Assignee: Nokia Telecommunications OY, Espoo, Finland

[21] Appl. No.: 379,661

[22] PCT Filed: Jun. 6, 1994

[86] PCT No.: PCT/FI94/00240

§ 371 Date: Apr. 10, 1995

§ 102(e) Date: Apr. 10, 1995

[87] PCT Pub. No.: WO94/29976

PCT Pub. Date: Dec. 22, 1994

[30] Foreign Application Priority Data

Jun. 11, 1993 [FI] Finland ..................... 932699

[51] Int. Cl.[6] ........................... H04B 17/00
[52] U.S. Cl. .................. 370/241; 370/347; 455/67.4
[58] Field of Search .................. 370/13, 15, 17, 370/95.1, 95.3; 455/67.1, 67.4, 103, 115, 226.1; 340/825.05, 825.01; 371/3, 5.1

[56] References Cited

U.S. PATENT DOCUMENTS

| | | | |
|---|---|---|---|
| 4,397,020 | 8/1983 | Howson | 370/13 |
| 4,670,789 | 6/1987 | Plume | 455/115 |
| 5,109,535 | 4/1992 | Kume et al. | 455/67.4 |
| 5,124,985 | 6/1992 | Hoshikawa | 370/95.3 |
| 5,442,811 | 8/1995 | Kobayashi et al. | 455/115 |
| 5,457,812 | 10/1995 | Siira et al. | 45/103 |

FOREIGN PATENT DOCUMENTS

| | | |
|---|---|---|
| 0492531 | 7/1992 | European Pat. Off. . |
| 9119364 | 12/1991 | WIPO . |
| 9212582 | 7/1992 | WIPO . |

*Primary Examiner*—Douglas W. Olms
*Assistant Examiner*—Chau T. Nguyen
*Attorney, Agent, or Firm*—Cushman Darby & Cushman IP Group of Pillsbury Madison & Sutro LLP

[57] ABSTRACT

A method for testing a transceiver unit of a time-divisional radiocommunication system includes assigning at least two free time slots for use, selected in such a manner that when the transmitter of the unit transmits on the first selected time slot, the receiver of the unit simultaneously receives the second selected time slot. A predetermined test signal is transmitted by the transmitter using the first selected time slot. The transmitted signal is converted into the reception frequency of the unit and supplied to the receiver, which receives the second selected time slot. The signal obtained from the output of the receiver is compared with the test signal supplied to the transmitter. Also, a base station of a time-divisional radiocommunication system, to which the method can be applied.

7 Claims, 1 Drawing Sheet

METHOD FOR TESTING A TRANSCEIVER, AND BASE STATION OF A TIME-DIVISIONAL RADIOCOMMUNICATION SYSTEM

BACKGROUND OF THE INVENTION

The invention relates to a method for testing a transceiver unit in a time-divisional radiocommunication system, the method comprising supplying a predetermined test signal from the transmitter to the receiver, and subsequently comparing the test signal transmitted with the test signal received, and to a base station of a time-divisional radiocommunication system, the base station comprising at least one transceiver unit and a test unit for testing the operation of the transceiver unit, the test unit comprising mixing means for converting the test signal transmitted by the transmitter of the transceiver unit from transmission frequency into reception frequency, the output of the mixing means being arranged to supply the test signal of the reception frequency to the receiver, and control means for supplying test data to the transmitter of the transceiver unit and for comparing the output signal of the receiver with the test data supplied to the transmitter.

In this application the term transceiver unit refers to a unit which comprises a transmitter and a receiver and which can be mounted in a base station of a time-divisional radiocommunication system (TDMA=Time Division Multiple Access), such as the GSM system, where it is connected to the antenna connections of the base station.

To ensure the operation of a transceiver unit, it is previously known to use a separate test device connected between the antenna connections of the transmitter and the receiver. If the transceiver unit is part of such a base station of a radiocommunication system that comprises several transceiver units, the separate test device is positioned after the transmitter combiner of the base station. In this case, the same test unit is used for testing several transceiver units. The test device converts the test signal transmitted by the transmitter of the unit into the reception frequency of the receiver of the unit and supplies it to the input of the receiver after a short delay, which in the transceiver concerned must occur between the transmission and reception of one channel. According to the GSM Specifications, for example, this delay is three channel time slots. The operation of the transceiver is checked by comparing the signal obtained from the output of the receiver with the test data supplied to the transmitter.

The structure of known test devices is very complicated owing to the delay components they contain for providing the delay mentioned above, e.g. the delay of three time slots according to the GSM Specifications. In the known test units, these delay components are either analog or digital, in which case they comprise an analog-to-digital converter, a digital shift register and a digital-to-analog converter.

SUMMARY OF THE INVENTION

The object of the present invention is to obviate the problem described above and to provide a simple and reliable method for testing the operation of a transceiver unit, and to provide a base station to which the method can be applied. These objects are achieved with a method according to the invention, which is characterized by assigning at least two free time slots for use, selected in such a manner that when the transmitter of the transceiver unit transmits on the first selected time slot, the receiver of the transceiver unit simultaneously receives the second selected time slot, supplying a predetermined test signal to the input of the transmitter, transmitting the predetermined test signal by the transmitter using the first selected time slot, converting the output signal transmitted on the first selected time slot into the reception frequency of the transceiver unit, supplying the signal of the reception frequency to the receiver, which receives the second selected time slot, and comparing the signal obtained from the output of the receiver with the test signal supplied to the transmitter.

The invention also relates to a base station which is characterized in that the base station comprises means for selecting two free time slots of the transceiver unit and for assigning them for the test, the control means of the transceiver unit conducting the testing of the operation of the unit using the selected time slots in such a manner that the transmitter transmits a test signal using the first selected time slot and the receiver receives the test signal using the second selected time slot.

The invention is based on the idea that the testing of a transceiver unit is much simpler than with the known solutions if the test is conducted by utilizing two time slots of the transceiver unit. In this case, it is not necessary to provide additional delays between the transmission and reception of a test signal. The fact that no additional delays are needed simplifies the structure of the test unit considerably as compared with the known solutions. The most significant advantage of the base station according to the invention is thus the simplicity of the structure of its test unit, which is due to the fact that the additional delay components used in the known test units are not needed at all.

In a preferred embodiment of the base station according to the invention, the test unit is integrated into the transceiver unit. In this way, it is possible to avoid the problem pertaining to the use of an external test unit, i.e. that the one conducting the test must have a considerable amount of information, for example, on the transmission frequencies used by the radiocommunication system/base station concerned so that the other traffic in the radiocommunication system/base station is not disturbed during the test. If a separate external test unit is used, the transceiver unit to be tested and the test device to be used must be separately adjusted before each test to avoid the above-mentioned disturbances.

BRIEF DESCRIPTION OF THE DRAWING

In the following, the invention will be described by means of a preferred embodiment and with reference to the appended drawings, in which.

DETAILED DESCRIPTION

Figure 1:
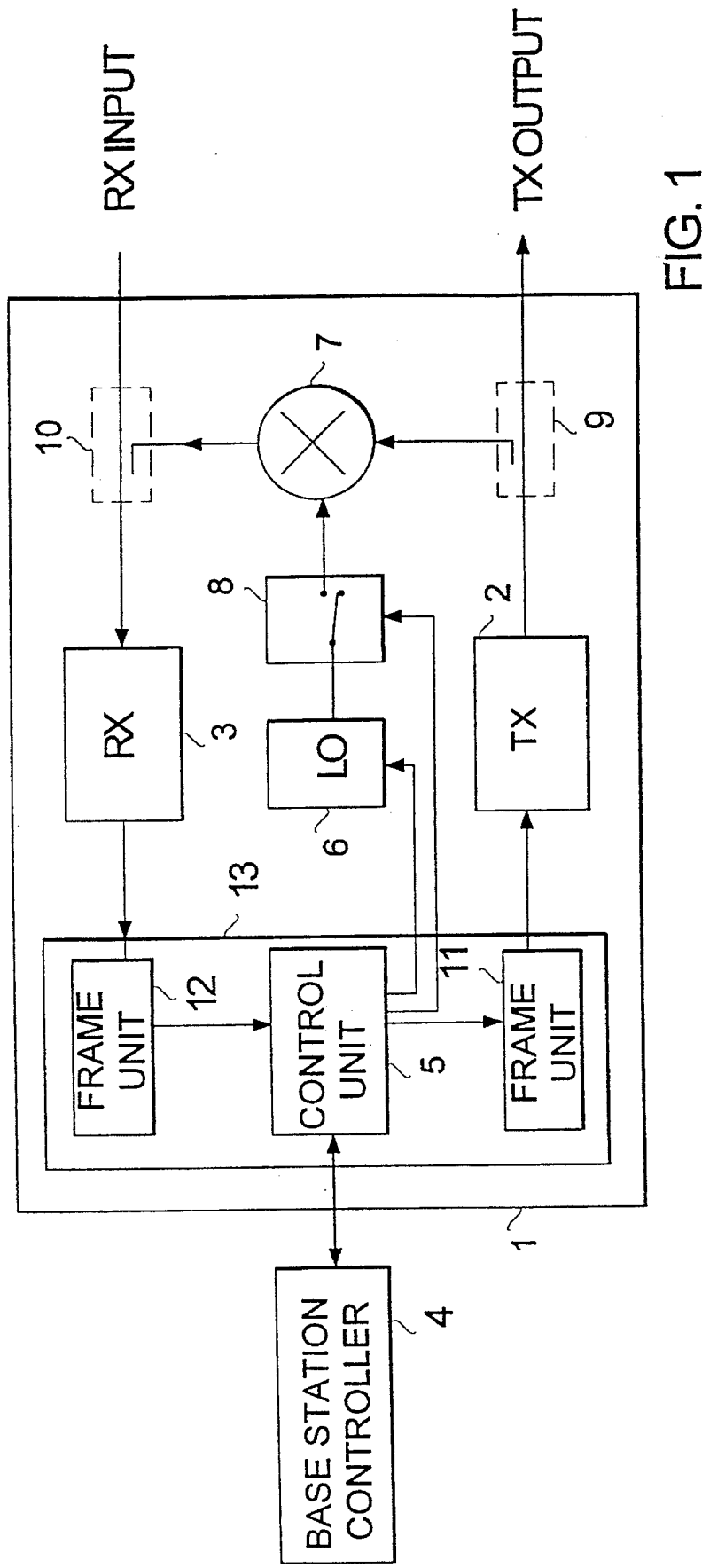
FIG. 1 shows part of a preferred embodiment of the base station according to the invention.

FIG. 1 shows part of a preferred embodiment of the base station according to the invention. FIG. 1 illustrates a transceiver unit 1 of a base station in the GSM system. The unit 1 illustrated in the figure tests the operation of the components of its transmitter 2 and receiver 3 by means of a loop integrated into the unit. The loop shown in the figure consists of components 7, 9 and 10 and is preferably integrated into each transceiver unit of the base station.

When the unit 1 is tested, the base station controller 4 selects two free time slots, e.g. time slots 4 and 1 (shown in FIG. 2), which do not carry any traffic at that particular moment. The time slots are selected in such a manner that when the transmitter 2 of the transceiver unit 1 transmits on the first selected time slot, e.g. on time slot 4, the receiver 3 receives the second selected time slot, e.g. time slot 1.

When the time slots to be used have been selected, the control unit 5 in the baseband section 13 of the transceiver unit 1 switches on the oscillator 6 of the transceiver unit. The oscillator 6 is thus switched on before the actual test is started to allow it to settle before the actual test. A suitable settling time is, for example, 10 ms.

When the actual test is conducted, the control unit 5 of the transceiver unit 1 switches on a mixer 7 by means of an RF switch 8 while supplying predetermined test data to the input of the transmitter 2 through a frame unit 11. The transmitter 2 transmits the test data supplied to it, using the first selected time slot, e.g. time slot 4.

The output of the transmitter 2 is connected via a directional coupler 9 to the mixer 7, which under the control of the control unit 5 operates during the test period, converting the test signal into reception frequency. The output of the mixer 6 is connected to a directional coupler 10, by means of which the signal of reception frequency is supplied to the input of the receiver 3 on the second selected time slot, e.g. time slot 1. Thus, unlike the known test devices, the test loop consisting of components 7, 9 and 10 does not comprise any components intended to introduce delay.

The output signal of the receiver 3 is supplied through the frame unit 12 to the control means 5, which compares the received test signal and the predetermined test data supplied to the transmitter 3 through the frame unit 11. The comparison can be made, for instance, by calculating the bit error ratio (BER) and comparing it with a predetermined reference value. If the bit error ratio obtained by calculation exceeds the reference value, the control means 5 sends information on this to the base station controller 4.

If the transceiver unit to be tested is of a type comprising a diversity branch (DIV RX), this branch can also be tested in addition to the actual receiver branch. If it is then observed that the normal receiver gives high BER results and the diversity branch gives normal BER results, the transceiver unit can be adjusted so as to use only the diversity branch, whereby the diversity function is naturally lost.

Figure 2:
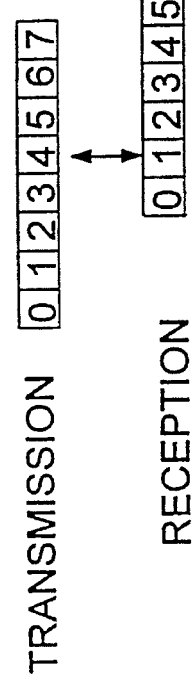
FIG. 2 is a schematic representation of how the time slots to be used should be selected for the testing of a transceiver unit of the GSM system.

FIG. 2 is a schematic representation of how the time slots to be used should be selected for the testing of a transceiver unit in the GSM system. The GSM Specifications require that a mobile station have a delay of three time slots between reception and transmission. FIG. 2 illustrates the effect of a delay of three time slots on the operation of a base station. When the transmitter (indicated by reference number 2 in FIG. 1) of a given transceiver unit in a GSM base station transmits on time slot 4, the receiver (indicated by reference number 3 in FIG. 1) of the same transceiver unit simultaneously receives time slot 1. The structure and operation of the GSM system is described in *The GSM System for Mobile Communications* by M. Mouly and M-B. Pautet, Palaiseau, France, 1992, ISBN: 2-9507190-0-7.

According to the invention, two time slots must thus be assigned for the test in order that the need of delay components in the test loop (components 7, 9 and 10 in FIG. 1) could be avoided and the test signal transmitted by the transmitter could be immediately supplied to the input of the receiver.

The above description and the accompanying drawings are intended merely to illustrate the invention without limiting it. Thus the embodiments of the method and base station according to the invention can vary within the scope of the appended claims.

I claim:

1. A method for testing a transceiver unit, having a transmitter and a receiver, the receiver having a reception frequency, in a time-divisional radiocommunication system, said method comprising:

assigning at least two free time slots for use, including a first selected time slot and a second selected time slot, selected in such a manner that when said transmitter transmits on the first selected time slot, said receiver simultaneously receives the second selected time slot, supplying a predetermined test signal to an input of said transmitter, transmitting a predetermined test signal as an output signal by said transmitter using said first selected time slot, converting said output signal transmitted on said first selected time slot into said reception frequency of said receiver, supplying said signal of said reception frequency to said receiver, which receives said second selected time slot, and comparing the signal obtained from an output of said receiver with said test signal supplied to said transmitter.

2. The method according to claim 1, wherein:

said transceiver unit is a transceiver unit of a base station in a GSM system.

3. A base station of a time-divisional radiocommunication system, said base station comprising:

at least one transceiver unit, having a transmitter and a receiver, the receiver having a reception frequency, a test unit for testing operation of the transceiver unit in a test, said test unit comprising:

mixing means for converting a test signal transmitted by said transmitter from transmission frequency into said reception frequency, said mixing means having an output arranged to supply said test signal of said reception frequency to said receiver, and control means for supplying test data to said transmitter and for comparing a resulting output signal of the receiver with the test data supplied to the transmitter, means for selecting two free time slots of said transceiver unit, including a first and a second free time slot and for assigning said two free times for said test, said control means being arranged for conducting testing operation of said unit using said time slots in such a manner that said transmitter transmits a test signal using said first free time slot and the receiver receives said test signal using said second free time slot.

4. The base station according to claim 3, wherein:

said base station is a base station of the GSM system.

5. The base station according to claim 3, wherein:

said test unit is integrated into said transceiver unit.

6. The base station according to claim 3, wherein:

said means for selecting the time slots is a base station controller of said base station.

7. The base station according to claim 3, wherein:

said control means comprises means for calculating a bit error ratio on the basis of comparison between said output signal of said receiver and said test data.

* * * * *